United States Patent
Mellary et al.

(10) Patent No.: US 8,510,993 B2
(45) Date of Patent: Aug. 20, 2013

(54) BACKLITE ASSEMBLY FOR A VEHICLE

(75) Inventors: Thomas Mellary, Aurora (CA); Douglas G. Broadhead, Brampton (CA); Traian Miu, Oakville (CA)

(73) Assignee: Magna Closures Inc., Newmarket (CA)

( * ) Notice: Subject to any disclaimer, the term of this patent is extended or adjusted under 35 U.S.C. 154(b) by 306 days.

(21) Appl. No.: 12/765,191

(22) Filed: Apr. 22, 2010

(65) Prior Publication Data
US 2010/0269412 A1    Oct. 28, 2010

Related U.S. Application Data

(60) Provisional application No. 61/171,604, filed on Apr. 22, 2009.

(51) Int. Cl.
*E06B 1/00* (2006.01)
(52) U.S. Cl.
USPC .................................. 49/380; 49/325; 49/123
(58) Field of Classification Search
USPC .................... 49/116, 118, 123, 413, 325, 380; 206/325
See application file for complete search history.

(56) References Cited

U.S. PATENT DOCUMENTS

| | | | | |
|---|---|---|---|---|
| 4,671,013 A * | 6/1987 | Friese et al. | ..................... | 49/380 |
| 4,674,231 A * | 6/1987 | Radek et al. | ..................... | 49/118 |
| 4,793,099 A * | 12/1988 | Friese et al. | ..................... | 49/380 |
| 5,146,712 A * | 9/1992 | Hlavaty | .......................... | 49/118 |
| 5,531,046 A * | 7/1996 | Kollar et al. | ..................... | 49/360 |
| 5,669,181 A * | 9/1997 | Kollar et al. | ..................... | 49/360 |
| 6,021,605 A * | 2/2000 | Laux et al. | ...................... | 49/361 |
| 6,119,401 A * | 9/2000 | Lin et al. | ........................... | 49/361 |
| 6,125,585 A * | 10/2000 | Koneval et al. | .................. | 49/349 |
| 6,324,788 B1 * | 12/2001 | Koneval et al. | .................. | 49/121 |
| 6,658,793 B2 * | 12/2003 | Perron | ........................... | 49/123 |
| 2010/0263290 A1 * | 10/2010 | Pawloski et al. | ................ | 49/413 |
| 2010/0263291 A1 * | 10/2010 | Bello et al. | ...................... | 49/413 |

* cited by examiner

*Primary Examiner* — Jerry Redman
(74) *Attorney, Agent, or Firm* — Millman IP Inc.

(57) ABSTRACT

In an aspect, the invention is directed to a backlite assembly for a vehicle such as a pickup truck. The backlite assembly incorporates a motor assembly and a motor driven belt engaged with a guide rail that can be mounted to a structural support that is bonded to the fixed windows of the backlite assembly. A motor driven belt is used to actuate a movable window between closed and open positions. The lower support can also integrate the rail directly therein. The lower support can additionally integrate a housing for the motor assembly.

22 Claims, 12 Drawing Sheets

BACKLITE ASSEMBLY FOR A VEHICLE

This application claims the benefits of U.S. Provisional Application No. 61/171,604, filed Apr. 22, 2009.

FIELD OF THE INVENTION

The present invention relates to backlite assemblies for vehicles.

BACKGROUND OF THE INVENTION

Figure 1:
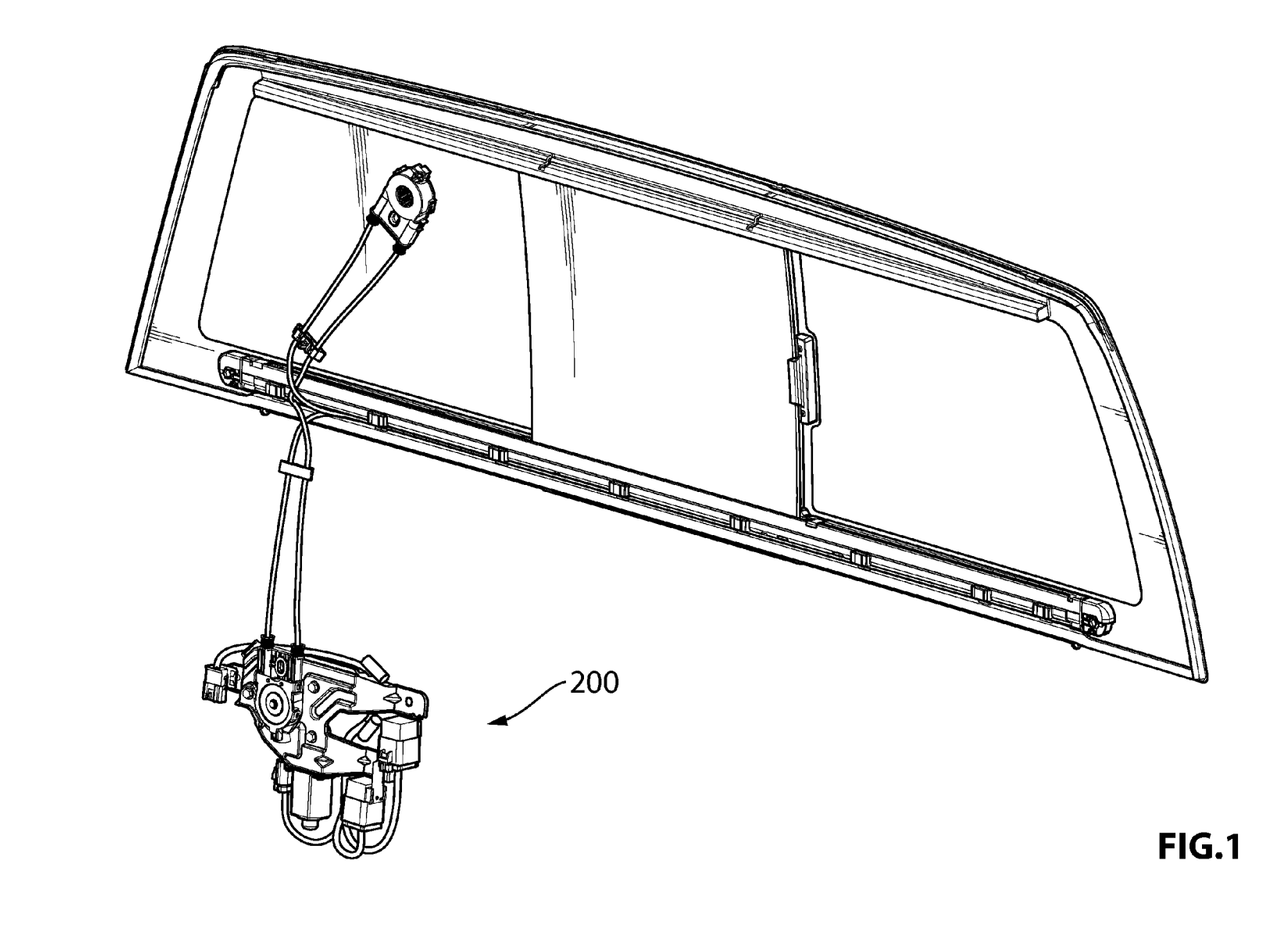
FIG. 1 is a perspective view of an electric power slider in accordance with the prior art.

Current power sliding backlite windows in pickup trucks typically employ a modified window regulator type cable and drum system, which is shown at 200 in FIG. 1, to pull the moving window from side to side. Cables need to be routed from the rear window to an alternate location, typically behind and below the rear seats, in order to have enough room for the cable drum and motor. Typically the same motor used to power side windows are used to power the backlite. This motor is typically has a stall torque of 7-9 Nm and is designed to lift windows against seal drag and gravity in a side door. Also, the use of a cable requires that the drum spool the required amount of travel onto itself increasing the height of the drum and it's required packaging space in the vehicle. This mechanism is assembled onto the backlite structure as individual components.

There are several problems, however, with these power sliding backlite assemblies. The current assembly relies on an aluminum frame that is overmolded with plastic for appearance. The aluminum frame is expensive as it requires many machining operations following extrusion to allow the moving glass assembly to be inserted into its grooves such that it is retained in the vertical and vehicle fore-aft direction. Also, typically, the backlite assembly is bonded to the vehicle during assembly. In order to accomplish this reliably and consistently, the assembly is best to be applied to the vehicle flange in one direction without any rotation, simply directly onto the vehicle. With the power mechanism as currently employed, methods to keep it from interfering with the adhesive and the vehicle frame are difficult and cumbersome. There is also additional weight and cost of a metal bracket to support the motor drive assembly for mounting to the vehicle.

SUMMARY OF THE INVENTION

In the first aspect, the backlite drive invention is directed to a separate drive mechanism consisting of a support channel within which slide the moving window. This drive mechanism is separate and self contained from the structure that is attached to the fixed glass panes. The structure attached to the glass is molded to accept the drive mechanism with or without the use of fasteners. The structure provides the necessary styling and water management functions of the assembly.

In a particular embodiment of the first aspect, the drive mechanism is driven by a motor attached to a toothed sprocket which drives a toothed belt. This belt may be a flexible metal belt with punched holes, or it may also be rubber with molded teeth.

In a particular embodiment of the first aspect, the end of the open loop rubber belt is retained within a body. The belt is wrapped around a body containing corresponding sprocket shapes. The belt is wrapped encircling the body and is inserted within a retaining body that prevents the belt from unwrapping, which prevents the belt from releasing from the retaining body as the belt is pulled upon.

In a particular embodiment of the first aspect, the belt is tensioned by springs that apply force between the belt retaining body and a bushing, which is a body that is attached to the moving glass.

In a particular embodiment of the first aspect, the bushing is retained in the support channel in the vertical and vehicle fore-aft directions and is permitted to slide in the vehicle cross-car direction. Two bushings, one on either side of the moving window, firmly attach to the moving window such that they provide support in the vertical and vehicle fore-aft directions.

In the second aspect, the aluminum rail for the drive mechanism is integrated into the support structure of the fixed windows. Formed from structural plastic, the lower support rail can provide the guiding channel for the sliding window as well as meet styling and water management requirements. The drive mechanism assembled with the lower structural rail is ready to bond to the fixed window elements of the backlite.

In the third aspect, the motor gear housing is integrated into the support structure of the fixed windows. Formed from structural plastic, the lower support rail can provide the guiding channel for the sliding window, meet styling and water management requirements, and integrate the motor gear box.

BRIEF DESCRIPTION OF THE DRAWINGS

The present invention will now be described by way of example only with reference to the attached drawings, in which.

DETAILED DESCRIPTION OF THE INVENTION

Figure 2:
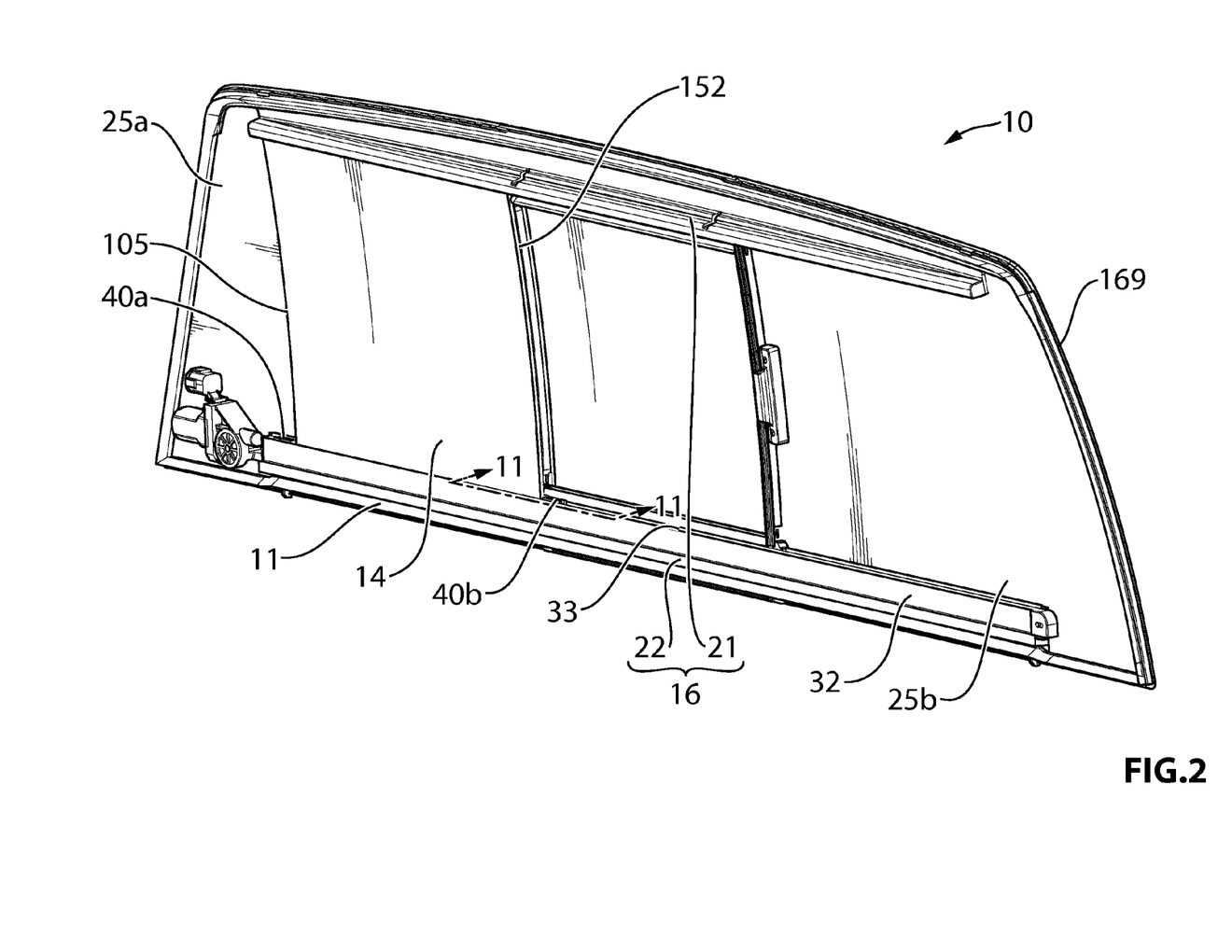
FIG. 2 is a perspective view of backlite assembly in accordance with an embodiment of the present invention.

Reference is made to FIG. 2, which shows backlite assembly 10 in accordance with an embodiment of the present invention. The backlite assembly 10 includes first and second fixed windows 25a and 25b, a movable window 14, a self-contained power sliding mechanism 11, and a support structure 16.

The first and second fixed windows 25a and 25b may be captured in any suitable way by the support structure 16, such as by an adhesive in a groove in the support structure 16. The movable window 14 is driven by the power sliding mechanism 11 between a closed position shown in FIG. 2 and an open position (not shown). The power sliding mechanism 11 is self-contained and is supported on the support structure 16 so that the process for assembling the backlite assembly 10 and for installing it on a vehicle is relatively simple.

Figure 3:
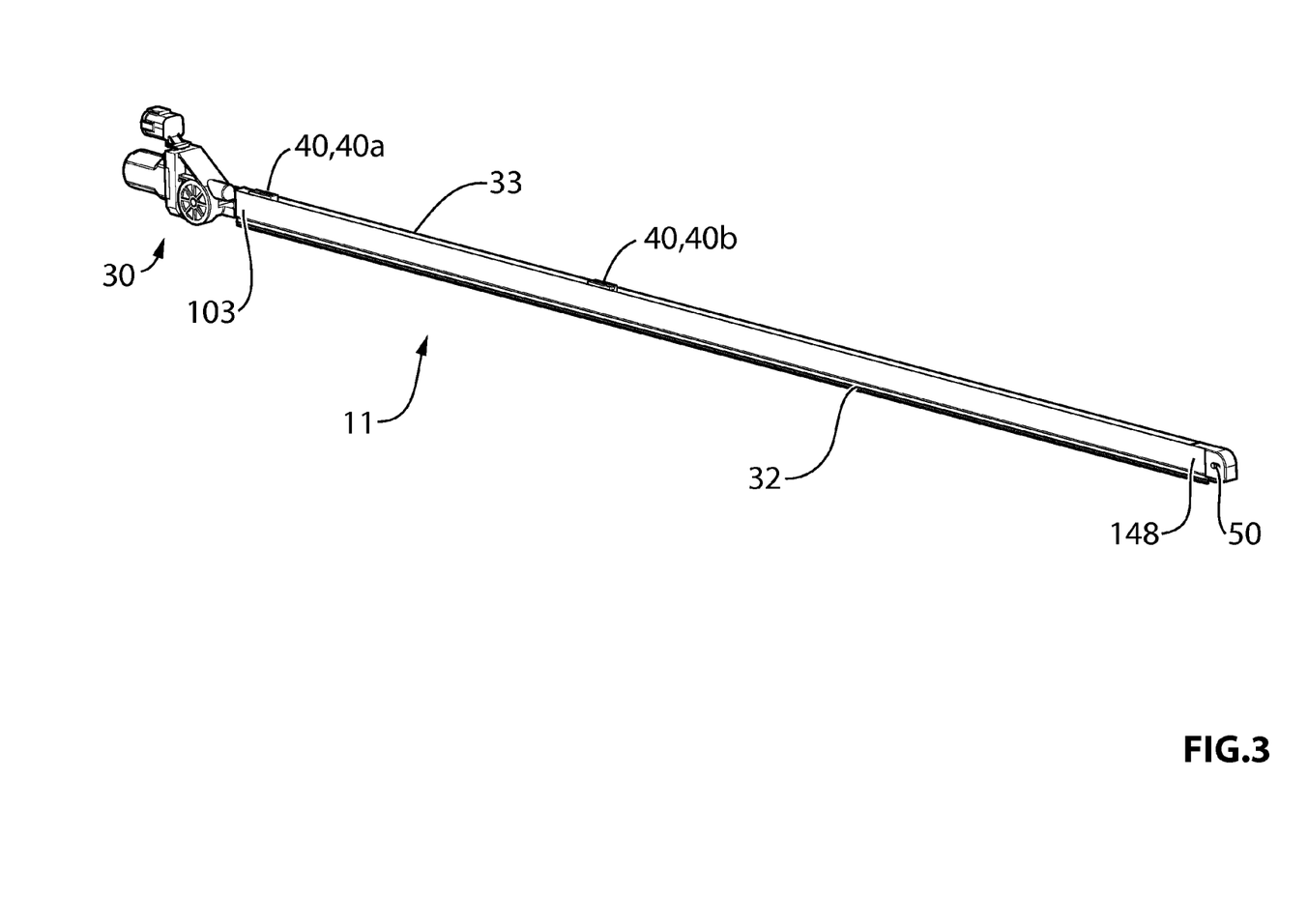
FIG. 3 is a perspective view of a power sliding mechanism that is part of the backlite assembly shown in FIG. 2.
Figure 6:
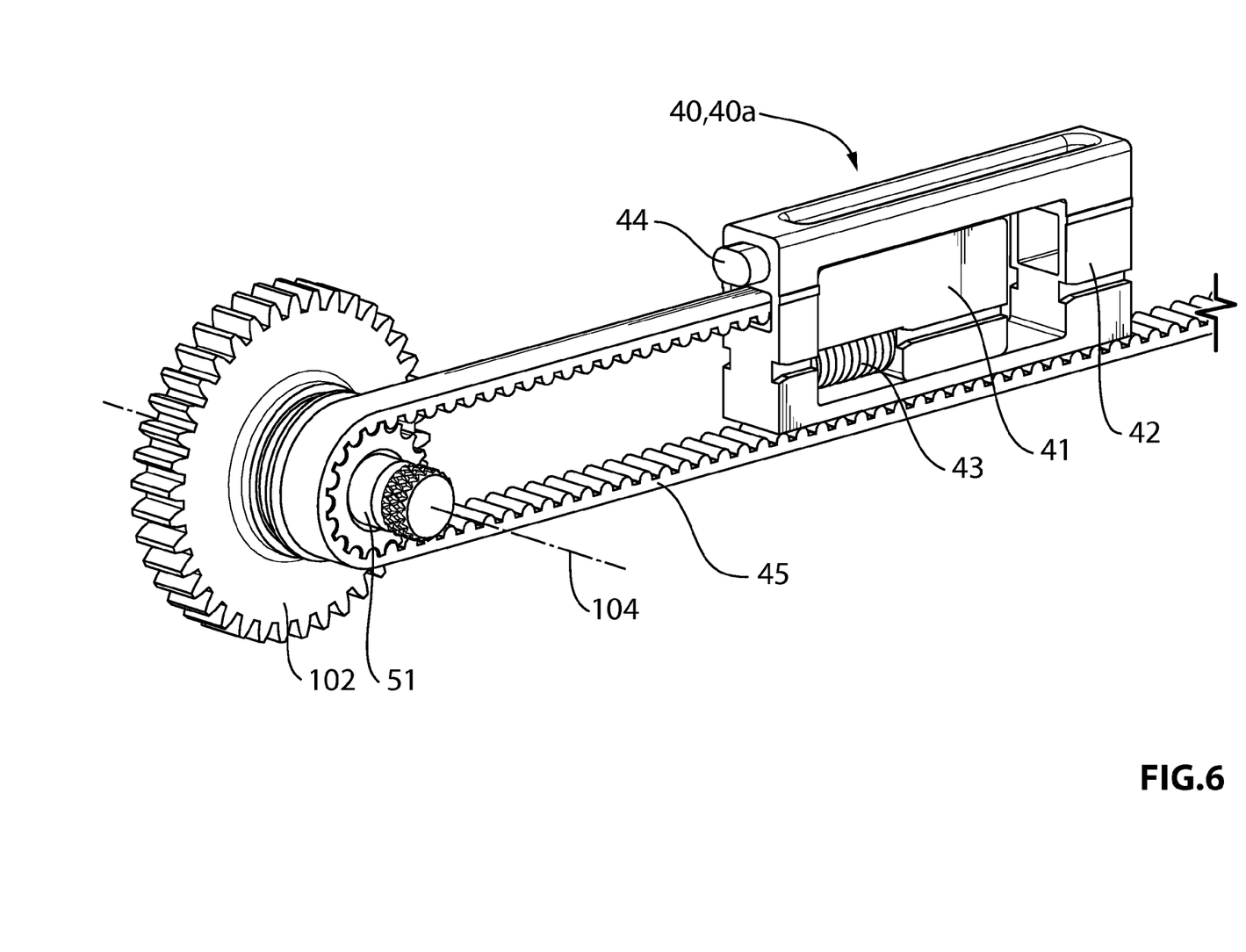
FIG. 6 is a perspective view of a sprocket and belt driving a sliding bushing which is part of the power sliding mechanism shown in FIG. 3.

Reference is made to FIG. 3, which shows the power sliding mechanism 11 prior to mounting to the support structure 16. The power sliding mechanism 11 includes a motor assembly 30, a belt 45 (FIG. 6), and a pair of bushing assemblies 40, shown individually at 40a and 40b. The motor assembly 30 includes a motor 100, which drives a worn gear (shown at 101 in FIG. 10), which in turn drives an output gear 102 (FIG. 6). The output gear 102 is integrally connected to a drive sprocket 51, and both rotate together about a first end axis 104. Referring to FIG. 3, the motor assembly 30 is attached to a first end 103 of a guide rail 32 that contains a slide channel 33. The guide rail 32 may be made from any suitable material such as aluminum. In this disclosure the term aluminum is intended to encompass any metallic material that includes aluminum, including for example a pure aluminum material and an aluminum alloy.

The bushing assembly 40a, which may be referred to as the first bushing assembly 40a slides in the channel 33 and is connected on a first side 105 (FIG. 2) of the movable window 14. The bushing assembly 40a is connected to a first end, shown at 106 in FIG. 8, of the belt 45. The connection may be by any suitable means. For example, the bushing assembly 40a may include a bushing body 108, a belt end retainer 110, a belt end retainer biasing member 112, and a connector 114 for connecting with the carrier, shown at 116, for the movable window 14. The bushing body 108 has an interior cavity 118 with a first end 120 and a second end 122. A slot 124 extends through from the exterior of the bushing body 108 to the first end 120 of the interior cavity 118. The belt end retainer 110 is movable within the interior cavity 118 and is biased towards the second end 122 by the belt end retainer biasing member 112, which may be any suitable biasing member such as a compression spring. The belt end retainer 110 has a slot 126 that aligns with the slot 124 in the bushing body 108, and a retaining aperture 128. The end 106 of the belt 45 is folded over a locking member 47. Teeth, shown at 130 from the belt 45 mate with grooves 132 in the locking member 47. The interior cavity 118 of the bushing body 108 is open on both sides and the slots 124 and 126 in the bushing body 108 and belt end retainer 110 are open on one side, so that the folded first end 106 of the belt 45 together with the locking member 47 may be slid laterally into the retaining aperture 128, in which it fits snuggly, while the belt 45 itself slides into the slots 126 and 124. The term 'laterally' in this particular instance refers to a direction that is perpendicular to the direction of travel of the bushing assembly 40a and of the belt 45. The belt 45 thus extends out from the bushing body 108 through the mouth of the slot 124 to the drive sprocket 51 (FIG. 6). As a result of the locking member 47 and the retaining aperture 128, the belt 45 is prevented from slipping relative to the locking member 47 and remains locked in the bushing assembly 40a and cannot be pulled out through the slot 124.

Figure 8:
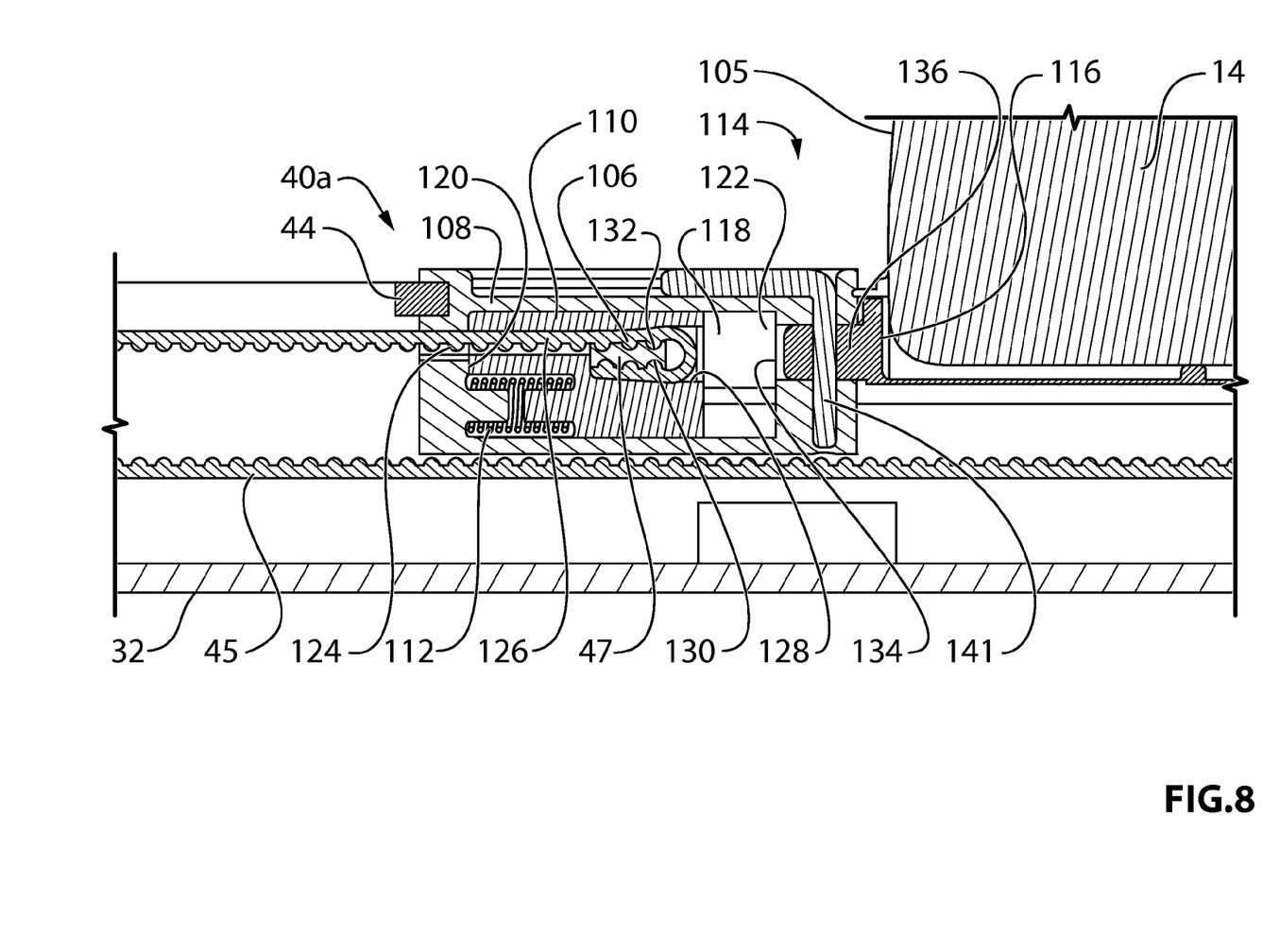
FIG. 8 is a sectional view of the bushing assembly shown in FIGS. 7a and 7b engaged in the sliding channel showing the belt connected thereto, showing belt tensioning capability and connection to the movable window.

By biasing the belt end retainer 110 towards the second end 122 of the interior cavity 118, tension is maintained on the belt 45.

The connector 114 may be made up of any suitable structure. For example, the bushing body 108 may include a slot 134 which receives a clevis 136 that is part of the carrier 116 for the movable window 14. A removable pin 140 passes through the bushing body 108 and through the clevis 136 to connect the bushing assembly 40a to the carrier 138 and therefore to the movable window 14.

The bushing assembly 40a may further include a bumper 44 which acts to reduce impact forces and noise at the extremes of travel of the movable window 14. It is additionally or alternatively possible to provide a stop bumper 44 on the rail 32 or in a suitable place on the support structure 16 for the same purpose.

Figures 7A, 7B:
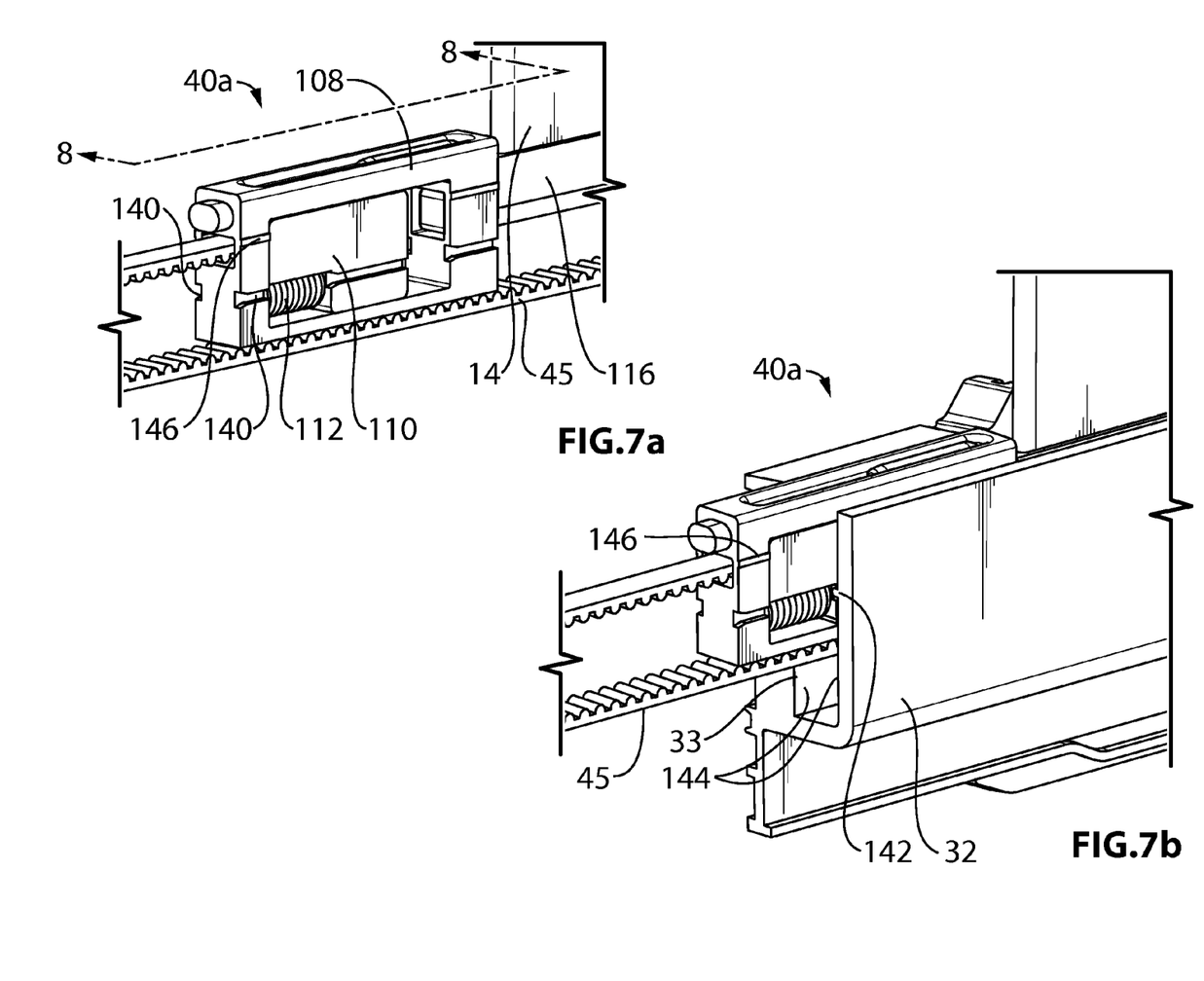
FIGS. 7a and 7b are perspective views of a bushing assembly engaged in a sliding channel that is part of the power sliding mechanism shown in FIG. 3.

With reference to FIG. 7a, the bushing body 108 includes a pair of support grooves 140 (one support groove 140 on each side of the bushing body 108), each of which captures a support rib 142 (FIG. 7b and FIG. 5) on each side wall 144 (FIG. 5) of the guide channel 33. Thus the support ribs 142 slidably support the bushing assembly 40a, and as a result the surface area of contact between the bushing assembly 40a and the guide channel 33 is relatively small. As a result, by sliding on the support ribs 142 lower frictional drag is incurred as compared to a bushing assembly that slides on the entirety of its lower surface. The carrier 138 (FIG. 8) for the movable window 14 also may slide on the support ribs 142 to similar advantage.

Additionally, the bushing body 108 includes a pair of side contact strips 146, (one on each side). These contact strips 146 extend outward from the bushing body 108 to engage the side walls 144 of the channel 33 during sliding of the bushing assembly 40a in the channel 33. These contact strips 146 are relatively thin and thus have a relatively small surface area, so that the frictional drag generated by their engagement with the side walls 144 is relatively small.

Figure 11:
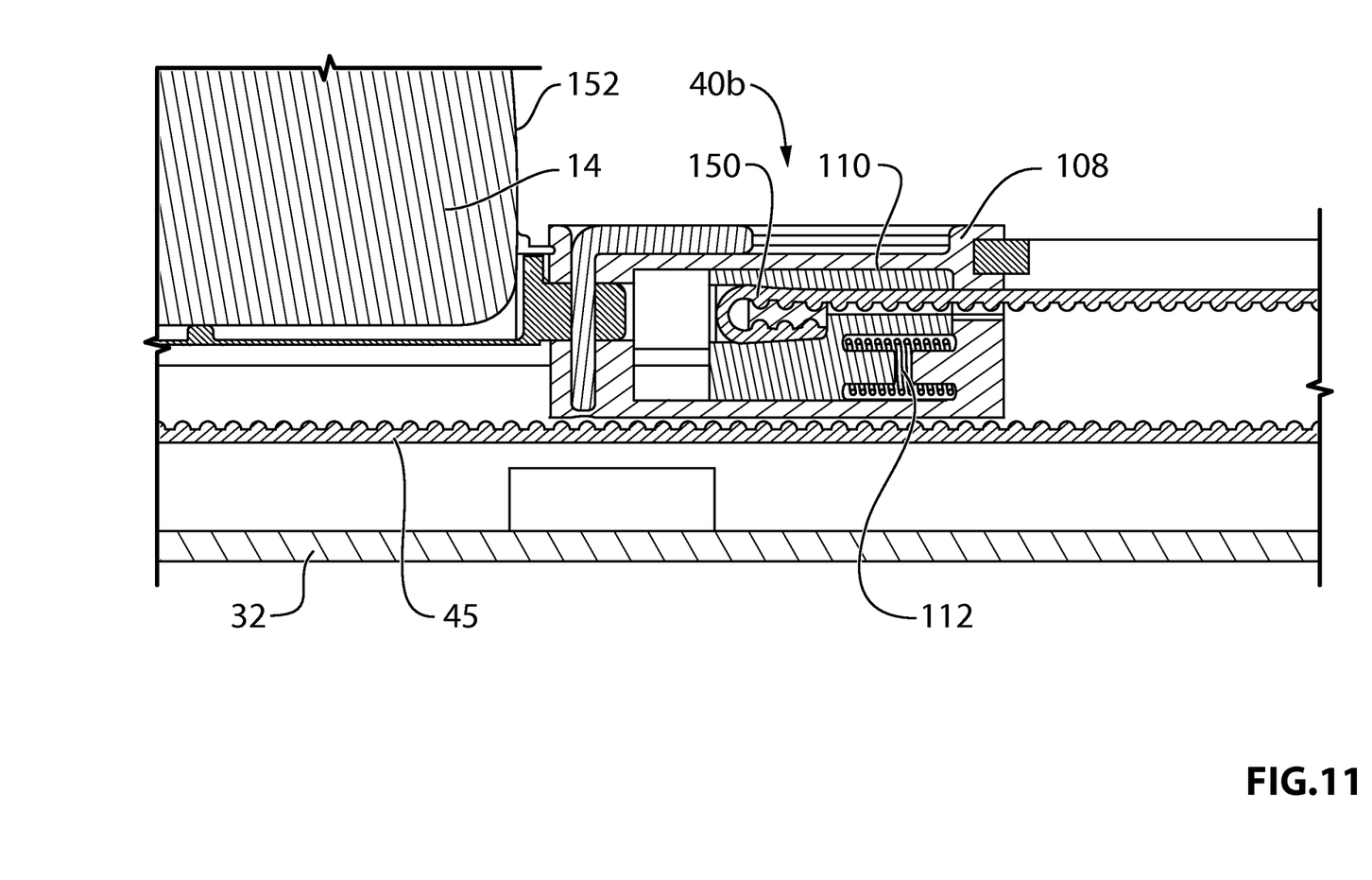
FIG. 11 is a sectional view of another bushing assembly engaged in the sliding channel showing the belt connected thereto, showing belt tensioning capability and connection to the movable window.

The belt 45 (FIG. 6) extends out from the slot 124, over to the drive sprocket 51, around the drive sprocket 51, along the channel 33 (FIG. 8) underneath the bushing assembly 40a to a second end 148 (FIG. 3) of the rail 32, around the idler 50 (which may be, for example, a pulley, a sprocket, or a fixed low-friction arcuate bearing surface) at the second end 148 of the rail 32, and finally, over to the second bushing assembly 40b. The second bushing assembly 40b (FIG. 11) may have the same structure as the first bushing assembly 40a (FIG. 8) but retains the second end, shown at 150 in FIG. 11, of the belt 45. The second bushing assembly 40b is connected to a second side 152 of the movable window 14.

The motor 100 drives the drive sprocket 51, which in turn drives the toothed belt 45. The motor 100 is a bi-directional motor and is thus capable of moving the belt 45, and accordingly the movable window 14, in two directions (ie. from its closed position to its open position and from its open position to its closed position).

Figure 4:
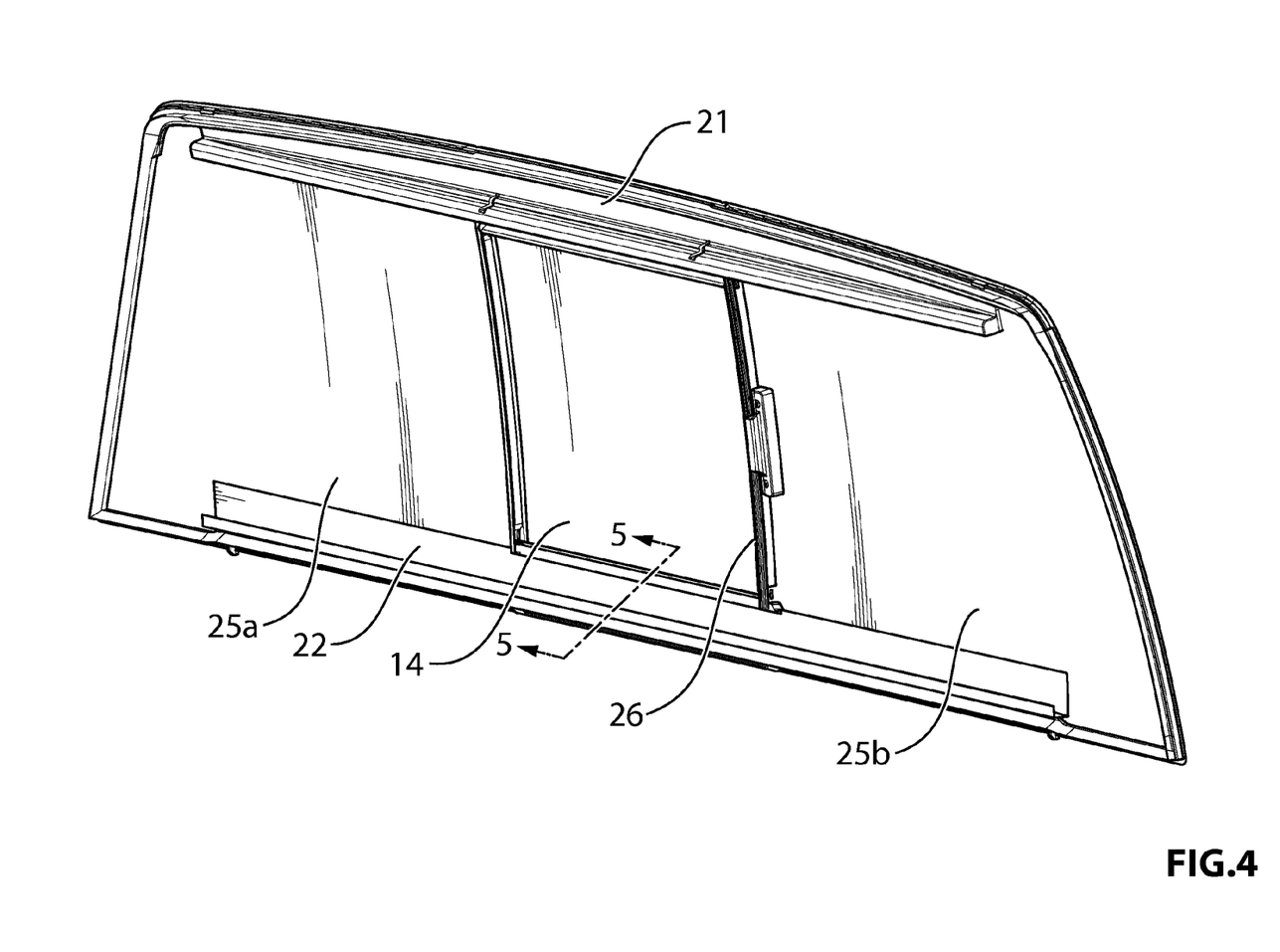
FIG. 4 is a perspective view of structural supports and fixed window parts of the backlite assembly shown in FIG. 2.

Reference is made to FIG. 4. The support structure 16 is made up of an upper support 21 and a lower support 22. The upper and lower supports together support the fixed windows 25a and 25b, the movable window 14. The lower support 22 additionally supports the power sliding mechanism 11.

The upper and lower supports 21 and 22 may be made from any suitable material such as a suitable polymeric material, such as glass reinforced polypropylene or glass reinforced nylon. The upper and lower supports 21 may be made by any suitable means such as by injection molding.

Seals 26 are provided to seal between the respective inboard edges of the fixed windows 25a and 25b and the movable window 14.

Figure 5:
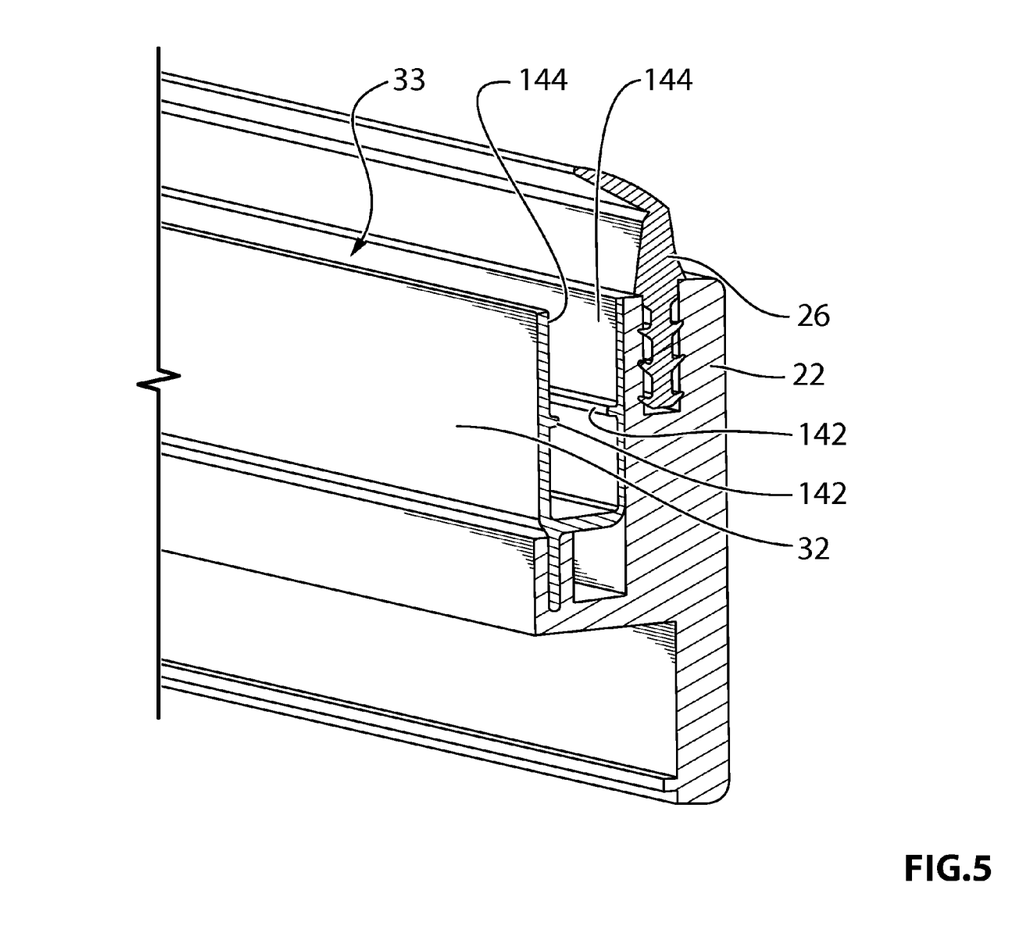
FIG. 5 is a sectional perspective view of an aluminum channel attached to a structural plastic window support which are part of the structural supports shown in FIG. 4.

Reference is made to FIG. 5, which shows a sectional view of the lower structural support 22 and the guide rail 32. The lower structural support 22 includes a groove 156 which receives a tongue 158 on the guide rail 32 in a friction fit, so that the guide rail 32 is retained in the support 22. Adhesive may be used to ensure that the guide rail remains fixed in position during use. Optionally, fasteners (eg. screws) could be used to more securely affix the guide rail 32 to the support 22. The support 22 also has a seal 26 mounted thereto for sealing against the movable window 14. The upper structural support 21 includes similar structure to the lower structural support 22.

It will be noted that the power sliding assembly 11 does not extend beyond the periphery of the backlite assembly 10 and is thus contained substantially within the periphery of the backlite assembly 10. The periphery is shown at 169, and is the outer edge of the subassembly comprising the fixed windows 25 and the upper and lower supports 21 and 22. As a result of this compact arrangement, the entire backlite assembly 10 may be insertable as a single assembly into a window opening in a vehicle having a periphery that is substantially the same size as the periphery 169 of the backlite assembly 10, which would result in relatively simple installation procedure.

Figure 9:
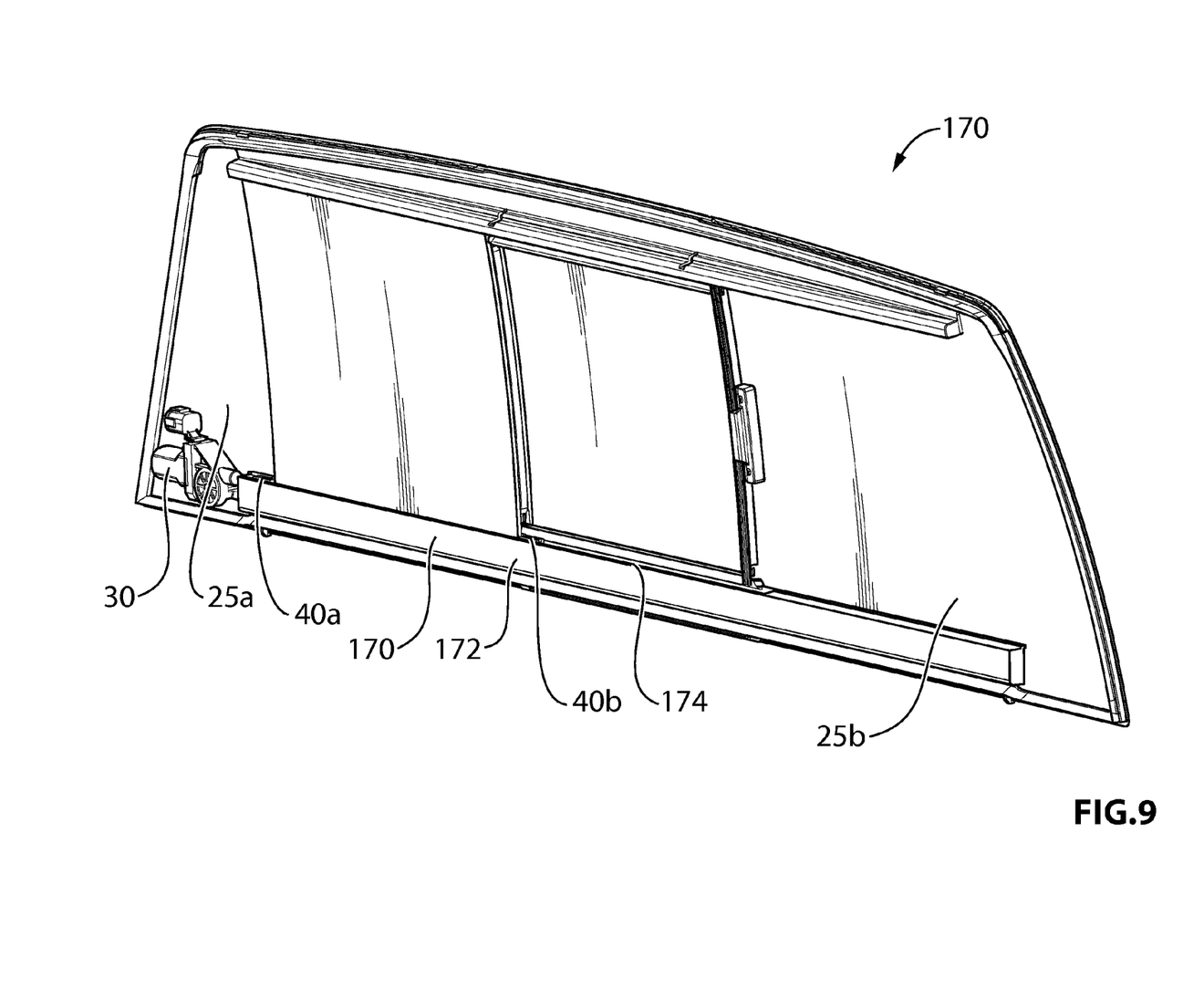
FIG. 9 is a perspective view of a backlite assembly in accordance with another embodiment of the present invention.

Reference is made to FIG. 9, which shows a perspective view of a backlite assembly 170 that is similar to the backlite assembly 10 (FIG. 2) but which has a lower structural support 172 that has integrally formed therein a guide rail 13 with a guide channel 174 that supports the sliding movable window 14 and the bushing assemblies 40a and 40b in similar manner to the channel 33 in the embodiment shown in FIG. 2. The lower support 172 may be made from a structural polymeric material, such as glass reinforced polypropylene or glass reinforced nylon, which has the guide rail and guide channel 174 integrally formed therein. Alternatively, the lower support 172 may be formed by overmolding polymeric material on an aluminum guide rail which has the channel 174 therein. By forming the channel 174 integrally in the lower structural support 172, there is no need to provide a separate guide rail 32 which would then have to be mounted to the structural support. In this way, assembly steps' are eliminated. In this embodiment, the motor assembly 30 is mounted directly to the lower support 172.

Figure 10A:
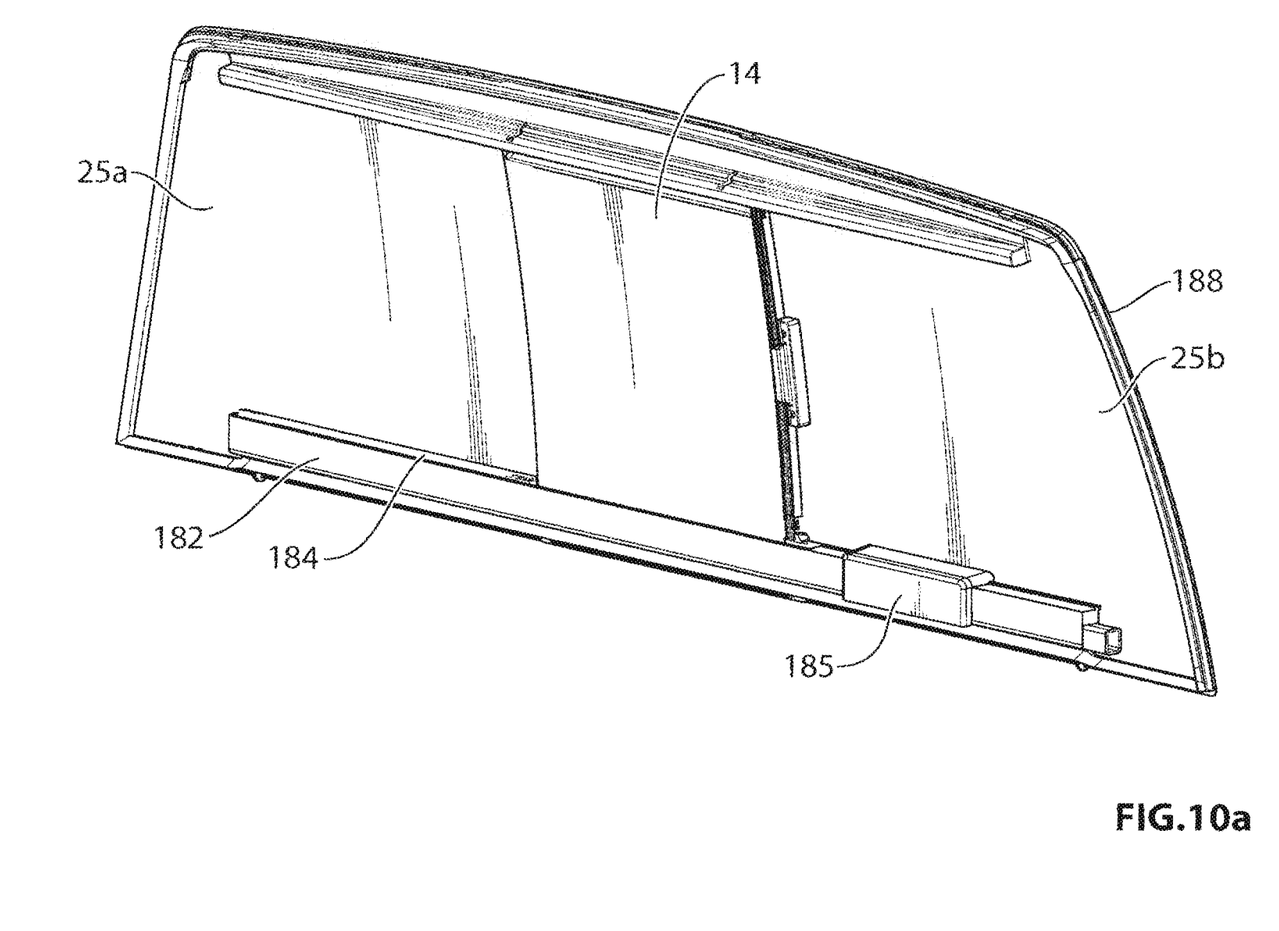
FIG. 10 is a perspective view of a backlite assembly in accordance with yet another embodiment of the present invention.
Figure 10B:
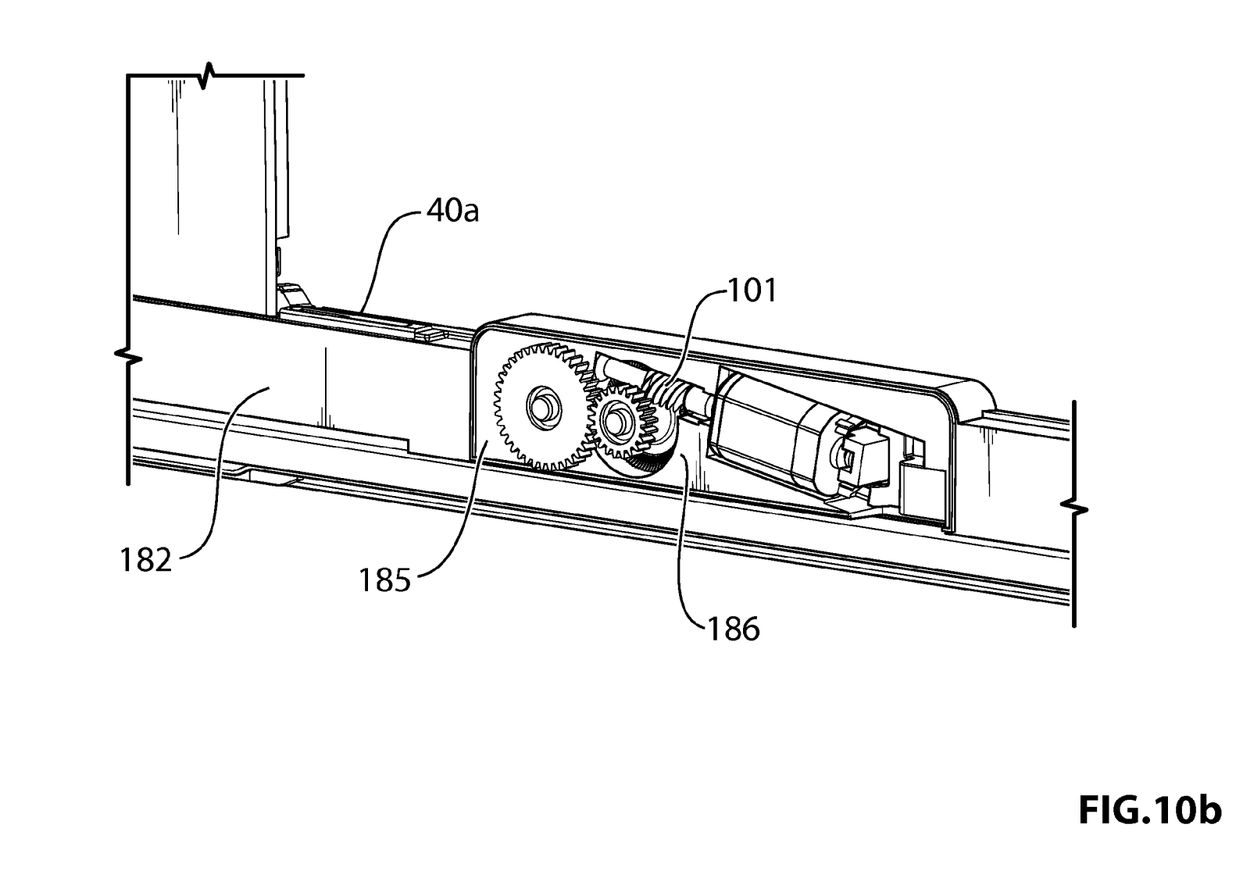

Reference is made to FIG. 10a, which shows a perspective view of a backlite assembly 180 that is similar to the backlite assembly 170 but which has a lower structural support 182 with a guide rail and a guide channel 184 integrally formed therein, and with a housing 185 for the motor assembly, shown at 186 in FIG. 10b, integrally formed therein. In this way, the motor assembly 186 is more securely supported and protected from damage than the cantilevered motor assembly 30 in the embodiment shown in FIGS. 2 and 9. In the embodiment shown in FIG. 10, the lower support 182 may have the channel 184 formed therein.

It will be noted that the motor assembly 186 is provided proximate the closed position of the movable window 14. This is advantageous in that it permits the open position of the movable window to be positioned closer to the periphery 188 of the backlite assembly 180 than would be possible if the motor assembly were positioned proximate the open position of the movable window 14.

The backlite assemblies described herein can be assembled substantially fully and can be shipped from the manufacturer to the OEM for installation in a vehicle with relatively little work. It may be possible to keep them in their assembled state and insert them as one piece into the window opening of the vehicle.

In the exemplary embodiments shown and described two fixed windows 25a and 25b are included in the backlite assembly. It is alternatively possible to provided some other number of fixed windows. For example, a single fixed window could be provided which would occupy one side of the window opening and a movable window would occupy the other side of the window opening. The movable window would not necessarily occupy 50% of the width of the window opening.

While the above description constitutes a plurality of embodiments of the present invention, it will be appreciated that the present invention is susceptible to further modification and change without departing from the fair meaning of the accompanying claims.

What is claimed is:

1. A backlite assembly for a vehicle, comprising:
   at least one fixed window;
   a support structure including a lower support and an upper support, wherein the support structure is mounted to the at least one fixed window to support the at least one fixed window, wherein the lower support has a guide channel therein, and wherein an outer edge of a subassembly of the at least one fixed window, the lower support and the upper support defines a periphery for the backlite assembly;
   a movable window that is slidable in the guide channel in the support structure between a closed position and an open position;
   a power sliding mechanism including
      a motor connected to the lower support,
      a drive wheel that is driven by the motor and that is positioned at one end of the guide channel,
      an idler at another end of the guide channel,
      a first flexible drive member segment extending away from one end of the movable window,
      a second flexible drive member segment extending away from another end of the movable window,
      wherein the first and second flexible drive member segments are drivable by the drive wheel to drive the movable window in a first direction towards the closed position and in a second direction towards the open position,
      wherein the power sliding mechanism is contained substantially within the periphery of the backlite assembly, thereby permitting the entire backlite assembly to be insertable as a single assembly into a window opening in a vehicle having a vehicle periphery that is substantially the same size as the periphery of the backlite assembly.

2. A backlite assembly as claimed in claim 1, further comprising a first bushing assembly that is slidable in the guide channel and that is connected to a first side of the movable window, and a second bushing assembly that is slidable in the guide channel and that is connected to a second side of the movable window, wherein the first flexible drive member segment is connected to the first bushing assembly, and the second flexible drive member segment is connected to the second bushing assembly.

3. A backlite assembly as claimed in claim 2, wherein the guide channel has a pair of side walls, wherein each side wall has a rib that extends therefrom, wherein each bushing assembly includes a bushing body which has grooves which mate with the ribs on the side walls to support the bushing assembly in the guide channel.

4. A backlite assembly as claimed in claim 3, wherein the bushing body includes a pair of contact strips extending outwardly therefrom, wherein each contact strip is positioned to engage one of the side walls and has a selected contact surface area.

5. A backlite assembly as claimed in claim 3, wherein the movable window is mounted to a carrier, wherein the carrier is slidably supported on the ribs on the side walls of the channel.

6. A backlite assembly as claimed in claim 3, wherein the backlite assembly is insertable as a single assembly into a window opening in a vehicle having a periphery that is substantially the same size as the periphery of the backlite assembly.

7. A backlite assembly as claimed in claim 2, wherein at least one bushing assembly includes a bushing body and an end retainer, wherein the end retainer is biased relative to the bushing body in a direction that maintains tension in one of the first and second flexible drive member segments.

8. A backlite assembly as claimed in claim 2, wherein each bushing assembly includes a bushing body and an end retainer, wherein the end retainer is biased relative to the bushing body in a direction that maintains tension in the first and second flexible drive member segments.

9. A backlite assembly as claimed in claim 8, wherein the carrier is removably connected to each of the bushing assemblies.

10. A backlite assembly as claimed in claim 1, wherein the motor is a bidirectional electric motor.

11. A backlite assembly as claimed in claim 1, wherein the at least one fixed window includes a first fixed window and a second fixed window, wherein the movable window is between the first and second fixed windows when in the closed position.

12. A backlite assembly as claimed in claim 11, wherein the motor is positioned proximate the movable window when the movable window is in the closed position.

13. A backlite assembly as claimed in claim 1, wherein the first and second flexible drive member segments are part of a continuous toothed belt, and wherein the drive wheel is a drive sprocket.

14. A backlite assembly as claimed in claim 13, wherein each bushing assembly includes a locking aperture and a locking member, wherein the locking member has grooves that are complementary to teeth on the toothed belt, wherein an associated end of the toothed belt is folded over the locking member such that teeth on the toothed belt engage the grooves on the locking member, and wherein the locking member with the toothed belt folded thereover is slidable in a direction perpendicular to a direction of travel for the belt, into a locking aperture in the bushing assembly, such that the locking aperture is sized to prevent the belt from slipping relative to the locking member in the travel direction for the belt and wherein a shoulder of the locking aperture prevents the locking member and first end of the belt from being withdrawn together from the bushing assembly in the direction of travel of the belt.

15. A backlite assembly as claimed in claim 14, wherein each bushing assembly includes a bushing body and a belt end retainer, wherein the belt end retainer is biased relative to the bushing body in a direction that maintains tension in the toothed belt, wherein the locking aperture is in the belt end retainer.

16. A backlite assembly as claimed in claim 1, wherein the guide channel is defined in a guide rail that is connected to the lower support.

17. A backlite assembly as claimed in claim 16, wherein the lower support has a groove therein and wherein the guide rail has a tongue that frictionally fits in the groove.

18. A backlite assembly as claimed in claim 16, wherein the motor is directly mounted to the guide rail.

19. A backlite assembly as claimed in claim 1, wherein the guide channel is in a guide rail that is integrally formed in the lower support.

20. A backlite assembly as claimed in claim 1, wherein the at least one fixed window includes first and second fixed windows, and wherein the lower support extends between the first and second fixed windows.

21. A backlite assembly as claimed in claim 1, wherein the support structure further includes an upper support that is connected to both fixed windows.

22. A backlite assembly as claimed in claim 1, wherein the motor is connected to the lower support at an intermediate position along the lower support, proximate the movable window when the movable window is in the closed position.

* * * * *